United States Patent
Hanley (10) Patent No.: US 10,353,109 B2
(45) Date of Patent: *Jul. 16, 2019

(54) X-RAY SCANNER WITH PARTIAL ENERGY DISCRIMINATING DETECTOR ARRAY

(71) Applicant: Rapiscan Systems, Inc., Torrance, CA (US)

(72) Inventor: Gerard Andrew Hanley, San Diego, CA (US)

(73) Assignee: Rapiscan Systems, Inc., Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/787,886

(22) Filed: Oct. 19, 2017

(65) Prior Publication Data

US 2018/0292565 A1    Oct. 11, 2018

Related U.S. Application Data

(63) Continuation of application No. 14/148,452, filed on Jan. 6, 2014, now Pat. No. 9,823,383.

(60) Provisional application No. 61/749,838, filed on Jan. 7, 2013.

(51) Int. Cl.
   *G01V 5/00* (2006.01)

(52) U.S. Cl.
   CPC ................. *G01V 5/0041* (2013.01)

(58) Field of Classification Search
   CPC ....... G01V 5/0041; G01V 5/00; G01V 5/0016
   USPC ................. 378/11, 14, 145, 57, 62
   See application file for complete search history.

(56) References Cited

U.S. PATENT DOCUMENTS

| | | |
|---|---|---|
| 2,299,251 A | 10/1942 | Perbal |
| 2,831,123 A | 4/1958 | Daly |
| 3,707,672 A | 12/1972 | Miller |
| 3,713,156 A | 1/1973 | Pothier |
| 3,766,387 A | 10/1973 | Heffan |
| 3,784,837 A | 1/1974 | Holmstrom |
| 4,047,035 A | 9/1977 | Dennhoven |
| 4,122,783 A | 10/1978 | Pretini |
| 4,139,771 A | 2/1979 | Dennhoven |
| 4,210,811 A | 7/1980 | Dennhoven |
| 4,216,499 A | 8/1980 | Dennhoven |
| 4,366,382 A | 12/1982 | Kotowski |

(Continued)

FOREIGN PATENT DOCUMENTS

| | | |
|---|---|---|
| EP | 2941775 | 11/2015 |
| GB | 2299251 | 9/1996 |

(Continued)

OTHER PUBLICATIONS

Notice of Allowance dated Dec. 24, 2014 for U.S. Appl. No. 13/775,256.

(Continued)

*Primary Examiner* — Nicole M Ippolito
(74) *Attorney, Agent, or Firm* — Novel IP (57) ABSTRACT

The present specification describes a scanning/inspection system configured as a dual-view system using dual-energy sensitive stacked detectors that are partially populated with multi-energy discriminating detectors for overall enhanced energy resolution and therefore improved discrimination of materials through better estimation of material physical properties such as density and effective atomic number.

12 Claims, 4 Drawing Sheets

(56) References Cited

U.S. PATENT DOCUMENTS

| | | |
|---|---|---|
| 4,399,403 A | 8/1983 | Strandberg |
| 4,430,568 A | 2/1984 | Yoshida |
| 4,471,343 A | 9/1984 | Lemelson |
| 4,566,113 A | 1/1986 | Doenges |
| 4,599,740 A | 7/1986 | Cable |
| 4,641,330 A | 2/1987 | Herwig |
| 4,736,401 A | 4/1988 | Donges |
| 4,754,469 A | 6/1988 | Harding |
| 4,788,704 A | 11/1988 | Donges |
| 4,789,930 A | 12/1988 | Sones |
| 4,825,454 A | 4/1989 | Annis |
| 4,884,289 A | 11/1989 | Glockmann |
| 4,956,856 A | 9/1990 | Harding |
| 4,975,968 A | 12/1990 | Yukl |
| 4,979,202 A | 12/1990 | Siczek |
| 4,991,189 A | 2/1991 | Boomgaarden |
| 5,007,072 A | 4/1991 | Jenkins |
| 5,008,911 A | 4/1991 | Harding |
| 5,022,062 A | 6/1991 | Annis |
| 5,065,418 A | 11/1991 | Bermbach |
| 5,081,456 A | 1/1992 | Michiguchi |
| 5,091,924 A | 2/1992 | Bermbach |
| 5,098,640 A | 3/1992 | Gozani |
| 5,179,581 A | 1/1993 | Annis |
| 5,181,234 A | 1/1993 | Smith |
| 5,182,764 A | 1/1993 | Peschmann |
| 5,224,144 A | 6/1993 | Annis |
| 5,227,800 A | 7/1993 | Huguenin |
| 5,237,598 A | 8/1993 | Albert |
| 5,247,561 A | 9/1993 | Kotowski |
| 5,253,283 A | 10/1993 | Annis |
| 5,263,075 A | 11/1993 | McGann |
| 5,265,144 A | 11/1993 | Harding |
| 5,313,511 A | 5/1994 | Annis |
| 5,339,080 A | 8/1994 | Steinway |
| 5,345,240 A | 9/1994 | Frazier |
| 5,367,552 A | 11/1994 | Peschmann |
| 5,379,334 A | 1/1995 | Zimmer |
| 5,420,905 A | 5/1995 | Bertozzi |
| 5,493,596 A | 2/1996 | Annis |
| 5,524,133 A | 6/1996 | Neale |
| 5,552,705 A | 9/1996 | Keller |
| 5,557,283 A | 9/1996 | Sheen |
| 5,600,303 A | 2/1997 | Husseiny |
| 5,600,700 A | 2/1997 | Krug |
| 5,638,420 A | 6/1997 | Armistead |
| 5,642,393 A | 6/1997 | Krug |
| 5,642,394 A | 6/1997 | Rothschild |
| 5,666,393 A | 9/1997 | Annis |
| 5,687,210 A | 11/1997 | Maitrejean |
| 5,689,239 A | 11/1997 | Turner |
| 5,692,028 A | 11/1997 | Geus |
| 5,745,543 A | 4/1998 | De |
| 5,751,837 A | 5/1998 | Watanabe |
| 5,764,683 A | 6/1998 | Swift |
| 5,768,334 A | 6/1998 | Maitrejean |
| 5,787,145 A | 7/1998 | Geus |
| 5,805,660 A | 9/1998 | Perion |
| 5,838,759 A | 11/1998 | Armistead |
| 5,841,832 A * | 11/1998 | Mazess ............... A61B 6/032 378/56 |
| 5,903,623 A | 5/1999 | Swift |
| 5,910,973 A | 6/1999 | Grodzins |
| 5,930,326 A | 7/1999 | Rothschild |
| 5,940,468 A | 8/1999 | Huang |
| 5,974,111 A | 10/1999 | Krug |
| 6,026,135 A | 2/2000 | McFee |
| 6,031,890 A | 2/2000 | Bermbach |
| 6,054,712 A | 4/2000 | Komardin |
| 6,058,158 A | 5/2000 | Eiler |
| 6,067,344 A | 5/2000 | Grodzins |
| 6,081,580 A | 6/2000 | Grodzins |
| 6,094,472 A | 7/2000 | Smith |
| 6,118,850 A | 9/2000 | Mayo |
| 6,128,365 A | 10/2000 | Bechwati |
| 6,151,381 A | 11/2000 | Grodzins |
| 6,184,841 B1 | 2/2001 | Shober |
| 6,188,743 B1 | 2/2001 | Tybinkowski |
| 6,188,747 B1 | 2/2001 | Geus |
| 6,192,101 B1 | 2/2001 | Grodzins |
| 6,192,104 B1 | 2/2001 | Adams |
| 6,195,413 B1 | 2/2001 | Geus |
| 6,198,795 B1 | 3/2001 | Naumann |
| 6,216,540 B1 | 4/2001 | Nelson |
| 6,218,943 B1 | 4/2001 | Ellenbogen |
| 6,249,567 B1 | 6/2001 | Rothschild |
| 6,252,929 B1 | 6/2001 | Swift |
| 6,256,369 B1 | 7/2001 | Lai |
| 6,278,115 B1 | 8/2001 | Annis |
| 6,282,260 B1 | 8/2001 | Grodzins |
| 6,288,676 B1 | 9/2001 | Maloney |
| 6,292,533 B1 | 9/2001 | Swift |
| 6,301,326 B2 | 10/2001 | Bjorkholm |
| 6,320,933 B1 | 11/2001 | Grodzins |
| 6,342,696 B1 | 1/2002 | Chadwick |
| 6,356,620 B1 | 3/2002 | Rothschild |
| 6,359,582 B1 | 3/2002 | MacAleese |
| 6,359,597 B2 | 3/2002 | Haj-Yousef |
| 6,417,797 B1 | 7/2002 | Cousins |
| 6,421,420 B1 | 7/2002 | Grodzins |
| 6,424,695 B1 | 7/2002 | Grodzins |
| 6,434,219 B1 | 8/2002 | Rothschild |
| 6,435,715 B1 | 8/2002 | Betz |
| 6,442,233 B1 | 8/2002 | Grodzins |
| 6,445,765 B1 | 9/2002 | Frank |
| 6,453,003 B1 | 9/2002 | Springer |
| 6,453,007 B2 | 9/2002 | Adams |
| 6,456,093 B1 | 9/2002 | Merkel |
| 6,456,684 B1 | 9/2002 | Mun |
| 6,459,761 B1 | 10/2002 | Grodzins |
| 6,459,764 B1 | 10/2002 | Chalmers |
| 6,469,624 B1 | 10/2002 | Whan |
| 6,473,487 B1 | 10/2002 | Le |
| RE37,899 E | 11/2002 | Grodzins |
| 6,480,141 B1 | 11/2002 | Toth |
| 6,483,894 B2 | 11/2002 | Hartick |
| 6,501,414 B2 | 12/2002 | Arndt |
| 6,507,025 B1 | 1/2003 | Verbinski |
| 6,532,276 B1 | 3/2003 | Hartick |
| 6,542,574 B2 | 4/2003 | Grodzins |
| 6,542,578 B2 | 4/2003 | Ries |
| 6,542,580 B1 | 4/2003 | Carver |
| 6,546,072 B1 | 4/2003 | Chalmers |
| 6,552,346 B2 | 4/2003 | Verbinski |
| 6,563,903 B2 | 5/2003 | Kang |
| 6,580,778 B2 | 6/2003 | Meder |
| 6,584,170 B2 | 6/2003 | Aust |
| 6,597,760 B2 | 7/2003 | Beneke |
| 6,606,516 B2 | 8/2003 | Levine |
| 6,621,888 B2 | 9/2003 | Grodzins |
| 6,628,745 B1 | 9/2003 | Annis |
| 6,636,581 B2 | 10/2003 | Sorenson |
| 6,650,276 B2 | 11/2003 | Lawless |
| 6,653,588 B1 | 11/2003 | Gillard-Hickman |
| 6,658,087 B2 | 12/2003 | Chalmers |
| 6,663,280 B2 | 12/2003 | Doenges |
| 6,665,373 B1 | 12/2003 | Kotowski |
| 6,665,433 B2 | 12/2003 | Roder |
| 6,705,357 B2 | 3/2004 | Jeon |
| 6,735,477 B2 | 5/2004 | Levine |
| 6,763,635 B1 | 7/2004 | Lowman |
| 6,765,527 B2 | 7/2004 | Jablonski |
| 6,768,317 B2 | 7/2004 | Moeller |
| 6,785,357 B2 | 8/2004 | Bernardi |
| 6,796,944 B2 | 9/2004 | Hall |
| 6,798,863 B2 | 9/2004 | Sato |
| 6,812,426 B1 | 11/2004 | Kotowski |
| 6,816,571 B2 | 11/2004 | Bijjani |
| 6,831,590 B1 | 12/2004 | Steinway |
| 6,837,422 B1 | 1/2005 | Meder |
| 6,839,403 B1 | 1/2005 | Kotowski |
| 6,843,599 B2 | 1/2005 | Le |
| 6,856,271 B1 | 2/2005 | Hausner |
| 6,856,344 B2 | 2/2005 | Frantz |

(56) References Cited

U.S. PATENT DOCUMENTS

| | | | |
|---|---|---|---|
| 6,876,322 B2 | 4/2005 | Keller | |
| 6,891,381 B2 | 5/2005 | Bailey | |
| 6,894,636 B2 | 5/2005 | Anderton | |
| 6,920,197 B2 | 7/2005 | Kang | |
| 6,922,460 B2 | 7/2005 | Skatter | |
| 6,928,141 B2 | 8/2005 | Carver | |
| 7,039,159 B2 | 5/2006 | Muenchau | |
| 7,092,485 B2 | 8/2006 | Kravis | |
| 7,103,137 B2* | 9/2006 | Seppi | G01N 23/04 378/57 |
| 7,106,830 B2 | 9/2006 | Rosner | |
| 7,207,713 B2 | 4/2007 | Lowman | |
| 7,322,745 B2 | 1/2008 | Agrawal | |
| 7,356,115 B2 | 4/2008 | Ford | |
| 7,366,282 B2 | 4/2008 | Peschmann | |
| 7,369,643 B2 | 5/2008 | Kotowski | |
| 7,417,440 B2 | 8/2008 | Peschmann | |
| 7,486,768 B2 | 2/2009 | Allman | |
| 7,492,228 B2 | 2/2009 | Strange | |
| 7,505,562 B2 | 3/2009 | Dinca | |
| 7,551,718 B2 | 6/2009 | Rothschild | |
| 7,555,099 B2 | 6/2009 | Rothschild | |
| 7,579,845 B2 | 8/2009 | Peschmann | |
| 7,606,348 B2 | 10/2009 | Foland | |
| 7,609,807 B2 | 10/2009 | Leue | |
| 7,702,069 B2 | 4/2010 | Panesar | |
| 7,720,195 B2 | 5/2010 | Allman | |
| 7,831,012 B2 | 11/2010 | Foland | |
| 7,856,081 B2 | 12/2010 | Peschmann | |
| 7,864,920 B2 | 1/2011 | Rothschild | |
| 7,924,979 B2 | 4/2011 | Rothschild | |
| 7,928,400 B1 | 4/2011 | Diawara | |
| 7,995,705 B2 | 8/2011 | Allman | |
| 7,995,707 B2 | 8/2011 | Rothschild | |
| 8,005,189 B2* | 8/2011 | Ripp | G01V 5/0008 190/102 |
| 8,138,770 B2 | 3/2012 | Peschmann | |
| 8,213,570 B2 | 7/2012 | Panesar | |
| 8,385,501 B2 | 2/2013 | Allman | |
| 8,428,217 B2 | 4/2013 | Peschmann | |
| 8,442,186 B2 | 5/2013 | Rothschild | |
| 8,503,606 B2 | 8/2013 | Rothschild | |
| 8,674,706 B2 | 3/2014 | Peschmann | |
| 8,842,808 B2 | 9/2014 | Rothschild | |
| 8,861,684 B2 | 10/2014 | Al-Kofahi et al. | |
| 9,042,511 B2 | 5/2015 | Peschmann | |
| 9,099,279 B2 | 8/2015 | Rommel | |
| 9,310,322 B2 | 4/2016 | Panesar | |
| 9,417,060 B1 | 8/2016 | Schubert | |
| 9,466,456 B2 | 10/2016 | Rommel | |
| 9,535,019 B1 | 1/2017 | Rothschild | |
| 9,823,383 B2* | 11/2017 | Hanley | G01V 5/0041 |
| 2002/0008655 A1 | 1/2002 | Haj-Yousef | |
| 2003/0009202 A1 | 1/2003 | Levine | |
| 2003/0068557 A1 | 4/2003 | Kumashiro | |
| 2003/0179126 A1 | 9/2003 | Jablonski | |
| 2003/0185340 A1 | 10/2003 | Frantz | |
| 2003/0216644 A1 | 11/2003 | Hall | |
| 2004/0077943 A1 | 4/2004 | Meaney | |
| 2004/0141584 A1 | 7/2004 | Bernardi | |
| 2005/0058242 A1 | 3/2005 | Peschmann | |
| 2005/0117700 A1 | 6/2005 | Peschmann | |
| 2005/0180542 A1 | 8/2005 | Leue | |
| 2006/0098773 A1 | 5/2006 | Peschmann | |
| 2006/0145771 A1 | 7/2006 | Strange | |
| 2008/0170670 A1 | 7/2008 | Bhatt | |
| 2008/0230709 A1* | 9/2008 | Tkaczyk | G01T 1/249 250/370.09 |
| 2009/0010386 A1 | 1/2009 | Peschmann | |
| 2009/0285353 A1* | 11/2009 | Ellenbogen | G01V 5/005 378/9 |
| 2010/0034347 A1 | 2/2010 | Rothschild | |
| 2010/0295689 A1 | 11/2010 | Armistead | |
| 2011/0235777 A1 | 9/2011 | Gozani | |
| 2012/0104276 A1 | 5/2012 | Miller | |
| 2012/0300897 A1 | 11/2012 | Flohr | |
| 2013/0294574 A1 | 11/2013 | Peschmann | |
| 2015/0177391 A1 | 6/2015 | Cox | |
| 2015/0325010 A1 | 11/2015 | Bedford | |

FOREIGN PATENT DOCUMENTS

| | | |
|---|---|---|
| WO | 2004010127 | 1/2004 |
| WO | 2008135897 | 11/2008 |
| WO | 2014107675 | 7/2014 |
| WO | 2016011205 | 1/2016 |

OTHER PUBLICATIONS

Office Action dated Dec. 30, 2016 for U.S. Appl. No. 14/684,089.
Notice of Allowance dated Jan. 13, 2015 for U.S. Appl. No. 13/858,479.
Office Action dated Jun. 23, 2017 for U.S. Appl. No. 14/684,089; (pp. 1-9).
Notice of Allowance dated Oct. 26, 2017 for U.S. Appl. No. 14/684,089; (pp. 1-8).
Sheen, David et al. 'Three-Dimensional Millimeter-Wave Imaging for Concealed Weapon Detection', Sep. 2001, IEEE Transactions on Microwave Theory and Techniques, vol. 49, No. 9, pp. 1581-1592.
Office Action dated Mar. 18, 2015 for U.S. Appl. No. 14/165,177.
Notice of Allowance dated Aug. 20, 2015 for U.S. Appl. No. 14/165,177.
International Search Report for PCT/US2015/040653, dated Dec. 16, 2015.
Notice of Allowance dated Apr. 11, 2017 for U.S. Appl. No. 14/800,595.
Supplementary European Search Report for EP14735293, completed on Jul. 11, 2016.
Extended European Search Report for EP14735293, dated Jul. 21, 2016.
International Search Report for PCT/US2014/010370, dated May 13, 2014.
Office Action dated Nov. 2, 2015 for U.S. Appl. No. 14/148,452.
Office Action dated Mar. 29, 2016 for U.S. Appl. No. 14/148,452.
Office Action dated Sep. 22, 2016 for U.S. Appl. No. 14/148,452.
Office Action dated Mar. 6, 2017 for U.S. Appl. No. 14/148,452.
Notice of Allowance dated Jul. 19, 2017 for U.S. Appl. No. 14/148,452; (pp. 1-8).
Examination Report for GB1511523.1, dated Oct. 4, 2017.
Extended European Search Report for EP15821498.1, dated Jan. 25, 2018.
Icao: "Lithium Batteries in the Post", Oct. 21, 2011 (XP55438408, Retrieved from the Internet: URL:https://www.icao.int/safety/DangerousGoods/DGP 23 Working Papers/DGP.2.WP.071.5.en.pdf#search=lithium [retrieved on Jan. 5, 2018].

* cited by examiner

X-RAY SCANNER WITH PARTIAL ENERGY DISCRIMINATING DETECTOR ARRAY

CROSS-REFERENCE

The present application is a continuation application of U.S. patent application Ser. No. 14/148,452, entitled "X-Ray Scanner with Partial Energy Discriminating Detector Array" and filed on Jan. 6, 2014, which relies on U.S. Provisional Patent Application No. 61/749,838, of the same title and filed on Jan. 7, 2013, for priority. The aforementioned applications are herein incorporated by reference in their entirety.

FIELD

The present specification relates to X-ray inspection systems. More particularly, the present specification relates to a source, detector and object configuration, whereby the energy transmitted through the object being inspected is measured at improved energy resolutions.

BACKGROUND

Due to persistent security threats and the possibility of terrorist activities, there is a need for deploying high speed, high resolution, and accurate screening devices at places that are likely targets of such activities. In addition, there exists a requirement for screening of baggage and other items for explosives, contraband and other illicit materials. This requires a screening system which is capable of discriminating between different materials based on one or more unique features of each material such as effective atomic number, chemical structure, physical density, among other variables.

Cabinet X-ray scanners are capable of performing automated threat detection on articles of baggage and divested items by calculating physical properties of objects from the two-dimensional image generated. For example, material density can be estimated from at least two co-planar projection views. Z-effective can be estimated from at least two overlapping projection views acquired at different energy levels. Thus, increasing the number of views or number of energy levels permits for more precise estimations of physical properties such as material density and Z-effective.

Conventional cabinet X-ray systems have a limited number of co-planar views. It is highly desirable for commercial reasons to have as few views as necessary. Typically, a planar X-ray view consists of an X-ray generator and a linear array of X-ray detectors, which constitutes a majority of the component costs in an X-ray scanner. Each additional view increases the component cost of the scanner in an incremental manner. Thus, two views would imply twice the cost of a single view, three views would increase the cost three times, and so forth. Therefore, achieving desired imaging or automated detection performance with the fewest number of views allows the lowest component cost. Increasing performance through other means, such as higher performance detectors, becomes desirable because of the potential lower increase in component cost.

Further, increasing energy discrimination also has a detrimental impact on component cost. Commercially available X-ray detectors currently permit up to 128 channels of energy discrimination. Populating a multiple or even a single projection X-ray detector array with energy discriminating detectors is commercially prohibitive. The cost of energy discriminating detectors is significantly higher than conventional dual-energy detector arrays. For example, a conventional single-view X-ray scanner equipped with energy discriminating detectors would incur a three-fold increase in component cost. Reducing the number of energy discriminating detectors employed to increase performance becomes an attractive option, especially if the incremental increase in component cost is less than doubling the cost of the machine, i.e. less than the cost of adding a second view.

For an application such as liquids screening, it is desirable to have the full range of energy information permitting for a spectroscopic analysis of the contents in the divested container. Therefore, some applications present the opportunity to restrict the concept of operations such that only a portion of the projection view needs to be populated with multi-energy discriminating detectors in order to obtain improved estimation of the physical properties necessary for effective threat detection. For example, with respect to the divestiture of liquid containers at an aviation security checkpoint for separate threat detection analysis, only a portion of a bin or container need be screened using multi-energy discriminating detectors.

Thus, what is needed is an X-ray scanner, having at least a single-view, with limited energy discriminating detector coverage that can meet or exceed the automated detection performance of a dual-view X-ray scanner and still have a lower component cost, thus achieving the trade-off between cost and performance.

Accordingly, there is a need for an X-ray system that has an overall improved energy resolution to discriminate and therefore detect certain materials of interest.

SUMMARY

In one embodiment, the present specification describes a system for screening objects, comprising: a) a receptacle for holding an object; b) a conveyor to move the receptacle through an inspection region; c) first X-ray source for transmitting X-rays through the object for generating a vertical X-ray projection view of the said object; d) a second X-ray source for transmitting X-rays through the object for generating a horizontal X-ray projection view of the said object; e) a first set and a second set of transmission detectors for receiving the X-rays transmitted through the said object; and f) a third and a fourth set of energy discriminating detectors for receiving the X-rays transmitted through the said object, wherein said third and fourth set of energy discriminating detectors are positioned such that they align with the object within the receptacle.

In one embodiment, the present specification describes a method for screening objects, comprising: a) providing a receptacle to hold and align an object; b) moving the said receptacle through an inspection region using a conveyor; c) generating an X-ray projection view of the said object using an X-ray source; d) detecting X-rays transmitted through the said object using transmission detectors and at least one energy discriminating detector which is positioned such that it aligns with the object within the receptacle.

In one embodiment, the present specification describes a system for screening objects, comprising: a) a receptacle for holding an object; b) a conveyor to move the receptacle through an inspection region; c) an X-ray source for transmitting X-rays through the object for generating an X-ray projection view of the said object; d) a plurality of transmission detectors for receiving the X-rays transmitted through the said object; and e) a plurality of energy discriminating detectors for receiving the X-rays transmitted through the said object, wherein said plurality of energy discriminating detectors are positioned such that they align with the object within the receptacle.

In another embodiment, the present specification describes a method for screening objects, comprising: a) providing a receptacle to hold and align an object; b) moving the said receptacle through an inspection region using a conveyor; c) generating an X-ray projection view of the said object using an X-ray source; d) detecting X-rays transmitted through the said object using a plurality of transmission detectors; and e) detecting X-rays transmitted through the said object using a plurality of energy discriminating detectors which are positioned such that they align with the object within the receptacle.

In one embodiment, the present specification describes a method for screening objects, comprising: a) providing a receptacle to hold and align an object; b) moving the said receptacle through an inspection region using a conveyor; c) generating a vertical X-ray projection view of the said object using a first X-ray source; d) generating a horizontal X-ray projection view of the said object using a second X-ray source; e) detecting X-rays transmitted through the said object using a first set and second set of transmission detectors; and f) detecting X-rays transmitted through the said object using a third set and fourth set of energy discriminating detectors which are positioned such that they align with the object within the receptacle.

In another embodiment, the present specification describes a system for screening objects, comprising: a) a receptacle for holding an object; b) a conveyor to move the said receptacle through an inspection region; c) a first X-ray source for transmitting X-rays through the object for generating a vertical X-ray projection view of the said object; d) a second X-ray source for transmitting X-rays through the object for generating a horizontal X-ray projection view of the said object; e) a first set and a second set of transmission detectors for receiving the X-rays transmitted through the said object; f) a third and a fourth set of energy discriminating detectors for receiving the X-rays transmitted through the said object, wherein said third and fourth set of energy discriminating detectors are positioned such that they align with the object within the receptacle; and g) a processor for receiving output signals from said first, second, third and fourth sets of detectors and overlaying said output signals onto a visual image of the said receptacle and object.

In yet another embodiment, the present specification describes a method for screening objects, comprising: a) providing a receptacle to hold and align an object; b) moving the said receptacle through an inspection region using a conveyor; c) generating a vertical X-ray projection view of the said object using a first X-ray source; d) generating a horizontal X-ray projection view of the said object using a second X-ray source; e) detecting X-rays transmitted through the said object using a first and second set of transmission detectors; f) detecting X-rays transmitted through the said object using a third and fourth set of energy discriminating wherein said third and fourth set of energy discriminating detectors are positioned such that they align with the object within the receptacle; and g) processing the output signals from said first, second, third and fourth sets of detectors to form a visual image of the said receptacle and object.

In one embodiment, the receptacle is a tray further comprising a foam insert that has at least one channel to align the said object for screening. In one embodiment, the object is a LAG item.

In one embodiment, the first and second transmission detectors are dual-energy sensitive stacked detectors while the third and fourth energy discriminating detectors are fabricated from high-Z semiconductor materials including cadmium-telluride (CdTe), cadmium-zinc-telluride (CZT), mercury iodide ($HgI_2$), selenium (Se), lead iodide ($PbI_2$), gallium arsenide (GaAs).

The aforementioned and other embodiments of the present specification shall be described in greater depth in the drawings and detailed description provided below.

BRIEF DESCRIPTION OF THE DRAWINGS

These and other features and advantages of the present specification will be further appreciated, as they become better understood by reference to the detailed description when considered in connection with the accompanying drawings.

DETAILED DESCRIPTION

The present specification is directed towards scanning objects for threat/contraband detection. In one embodiment, the scanning/inspection system of the present specification is configured for screening objects at aviation security checkpoints. However, in alternate embodiments, the scanning/inspection system of the present specification is deployable at any such sites/places that are likely to be targets of terrorist activities—such as, border security checkpoints, entrances to buildings or other vulnerable premises, concert venues, sports venues, and the like.

In one embodiment, the scanning/inspection system of the present specification is configured as a single-view system using dual-energy sensitive stacked detectors that are partially populated with multi-energy discriminating detectors for overall enhanced energy resolution and therefore improved discrimination of materials through better estimation of material physical properties such as density and effective atomic number.

In one embodiment, the scanning/inspection system of the present specification is configured as a dual-view system using dual-energy sensitive stacked detectors that are partially populated with multi-energy discriminating detectors for overall enhanced energy resolution and therefore improved discrimination of materials through better estimation of material physical properties such as density and effective atomic number.

In one embodiment, the transmission detectors are dual-energy sensitive stacked detectors while the energy discriminating detectors are fabricated from high-Z semiconductor materials including cadmium-telluride (CdTe), cadmium-zinc-telluride (CZT), mercury iodide ($HgI_2$), selenium (Se), lead iodide ($PbI_2$), gallium arsenide (GaAs).

In accordance with an aspect of the present specification, a "receptacle" can be defined as an open, closed or closable vessel or container for housing objects that need to be scanned. The receptacle ensures that the objects therein are aligned, restricted, constrained or positioned to occupy a predetermined or predefined volumetric space with reference to the source, detector and conveyor configuration of an inspection system. In one embodiment the receptacle is an open tray. In another embodiment, the receptacle is a box with a closable lid. In accordance with one embodiment, the size of the receptacle is on the order of 550 mm wide×685 mm long×140 mm high.

In alternate embodiments, the receptacle is a piece of luggage or baggage containing objects that are not necessarily placed, positioned, oriented, or restricted in a predetermined fashion relative to the inspection system. Instead, the objects are placed in a random fashion as would be expected in typical luggage/baggage.

In accordance with an aspect of the present specification, an "object to be screened" can be defined as an open, closed or closable vessel, container or housing containing liquid or gel-based items that resemble liquid or gel-based explosives/threats such as liquid, aerosol and gel items (hereinafter referred to as "LAG" items). Categories of LAG items typically found in passenger carry-on baggage include, but are not limited to, alcohol/perfume/deodorants, drinks, foods, household products, medicines, toiletries, and the like. Prior to screening, LAG items are typically divested from baggage, luggage or personal effects and placed in a receptacle for scanning. In accordance with one embodiment, the object is of a size range that allows it to be placed in the receptacle. In one embodiment, volume ranges for a typical vessel to be screened are from 100 mL to 2000 mL.

In alternate embodiments, the object comprises any solid, powder or plastic-based threat or contraband items known to persons of ordinary skill in the art and is not limited to LAG items.

The present invention is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Figure 1A:
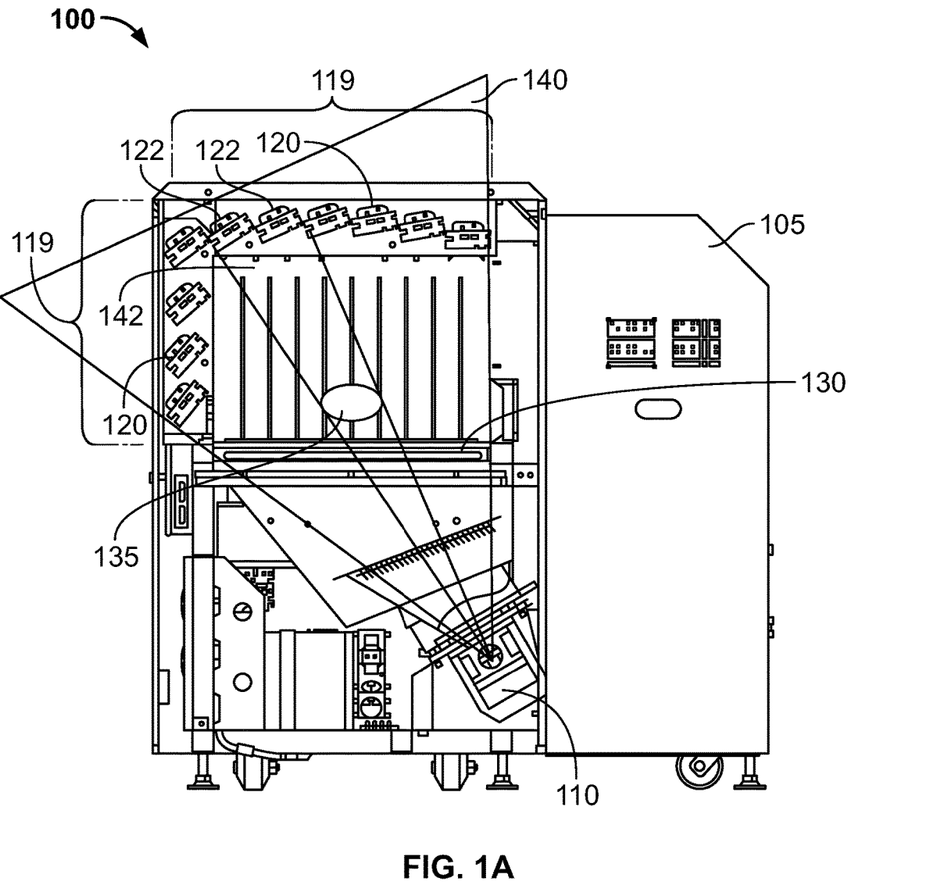
FIG. 1A is a side perspective view of the inspection system of the present specification showing a source irradiating an object to obtain a vertical projection view of the object.

FIG. 1A shows a side perspective view of an embodiment of an energy discriminating partial array inspection system 100 of the present specification in which a single-view vertical projection is provided. System 100 comprises a support frame 105 holding a first X-ray source 110 with focusing means, such as a collimating slit, and a first enhanced array 119 of stacked detectors 120 populated with at least one multi-energy discriminating detector 122 in accordance with an aspect of the present specification. In one embodiment, the detectors are placed in an L-shaped configuration; however, other configurations may be acceptable provided that the detectors are appropriately positioned relative to the inspection region and X-ray source.

It should be appreciated that the detector array of the present specification is known as a folded "L" detector configuration, and is made from multiple detector modules 120, 122. Each detector module is positioned at a different angle so as to be perpendicular to the X-ray fan beam. A typical small tunnel X-ray scanner will use approximately 10 detector modules. Not every detector module needs to be replaced with an energy discriminating detector module for the desired performance improvement. The projection of the container onto the image array determines which detector modules need to be of the energy discriminating variety. Referring to FIG. 1A, two energy discriminating modules 122 are shown to provide the advantages of the present specification.

Figure 1B:
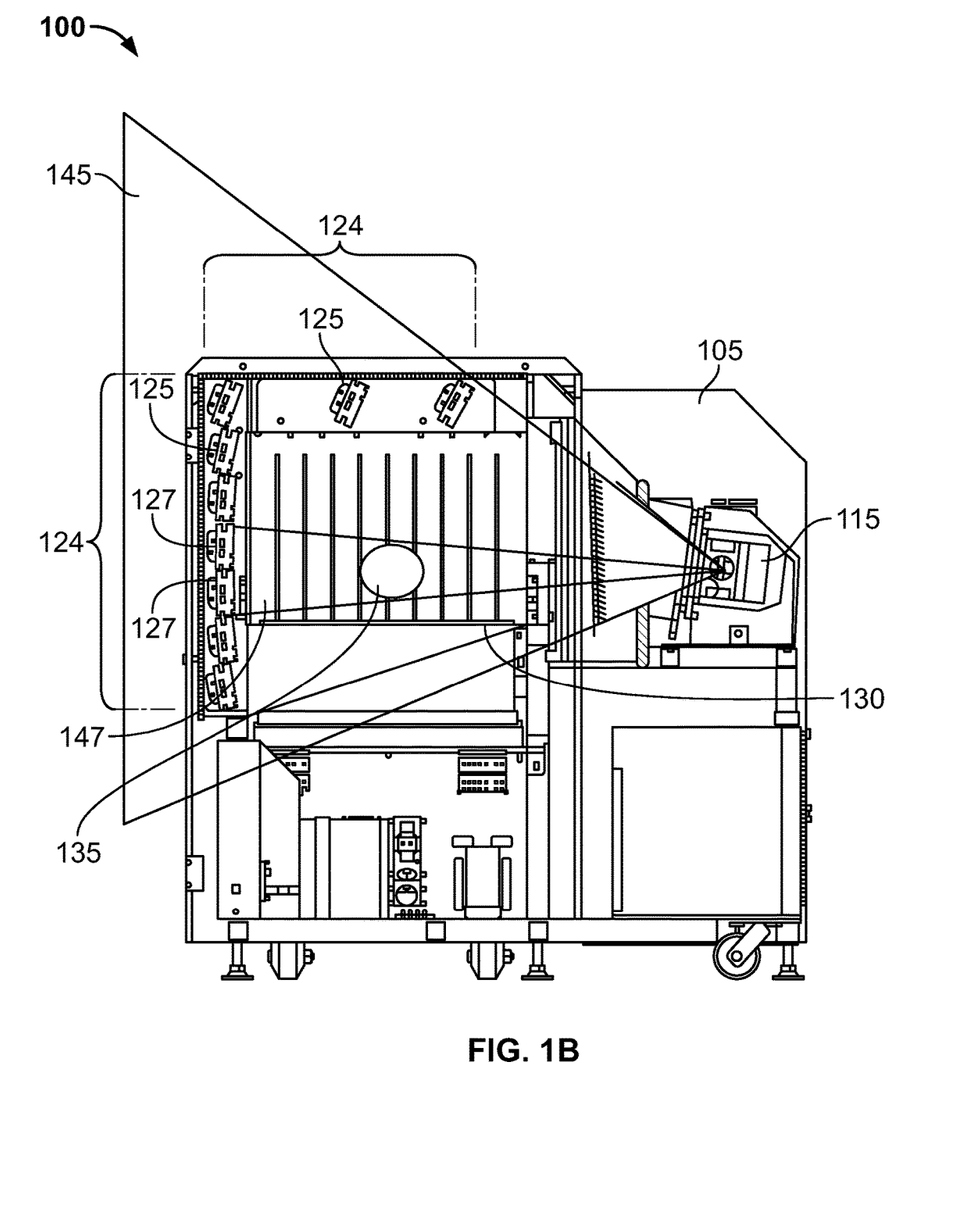
FIG. 1B is a side perspective view of the inspection system of the present specification showing a source irradiating the object to obtain a horizontal projection view of the object.

FIG. 1B is a side perspective view of an embodiment of an energy discriminating partial array inspection system 100 of the present specification in which a single-view horizontal projection is provided. System 100 comprises a support frame 105 holding a second X-ray source 115 with focusing means, such as a collimating slit, and an enhanced array 124 of stacked detectors 125 partially populated with at least one, and preferably two, multi-energy discriminating detectors 127 in accordance with an aspect of the present specification. In one embodiment, the detectors are placed in an L-shaped configuration; however, other configurations may be acceptable provided that the detectors are appropriately positioned relative to the inspection region and X-ray source. The energy discriminating detectors must be positioned to provide the image of the container under inspection. The information contained within the image of the container is used for the analysis and determination of the contents.

Referring to FIGS. 1A and 1B simultaneously, an inspection area/region in the form of a tunnel is defined between the sources and detectors to allow a receptacle 135 to be transported through using a conveyor 130. The receptacle 135 holds an object that is to be screened. It should be noted by those of ordinary skill in the art that while the present embodiment of the system 100 is a dual projection view system comprising two sources, in alternate embodiments the system 100 is a single projection view system comprising a single source whereas in still further embodiments the system 100 is a multi-projection view system comprising more than two sources. In one embodiment, the dual projection view system of the present invention employs 10 detector modules within detector array 119 for the vertical view and 9 detector modules within detector array 124 for the horizontal view.

Referring to FIGS. 1A and 1B simultaneously, in one embodiment, a minimum of two energy discriminating modules 122, 127, respectively, are employed in each detector array for significant enhancement of the physical property measurement of the system of the present specification in order to obtain a complete image of the container. Further, the embodiments shown in FIGS. 1A and 1B can be combined to provide a dual-view embodiment, as shown in FIG. 2B.

During screening, the sources project fan beams of X-rays onto the receptacle 135 such that the radiation-fans intersect the conveyor 130 substantially perpendicular relative to the conveyor surface. As shown in FIG. 1A, in one embodiment, source 110 is positioned to form a vertical projection view 140. In accordance with another aspect of the present specification, the receptacle 135 ensures that the position of the object to be screened is aligned or restricted relative to the source, detector and conveyor configuration so that portion 142 of the fan beam projection views 140 are sensed by the multi-energy discriminating detectors 122 to obtain improved estimation of the physical properties of the object for effective threat detection. This is described in greater detail below with respect to FIG. 2B.

As shown in FIG. 1B, in one embodiment, source 115 is positioned to form a horizontal projection view 145. In accordance with another aspect of the present specification, the receptacle 135 ensures that the position of the object to be screened is aligned or restricted relative to the source, detector and conveyor configuration so that portion 147 of the fan beam projection views 145 are sensed by the multi-energy discriminating detectors 127 to obtain improved estimation of the physical properties of the object for effective threat detection.

Figure 2A:
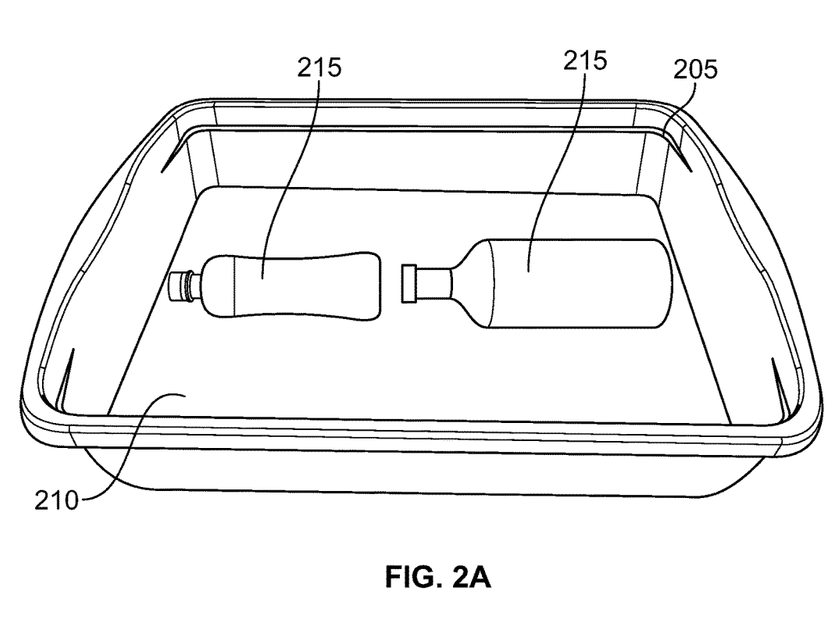
FIG. 2A shows a receptacle of the present specification in the form of a tray holding objects to be scanned.
Figure 2B:
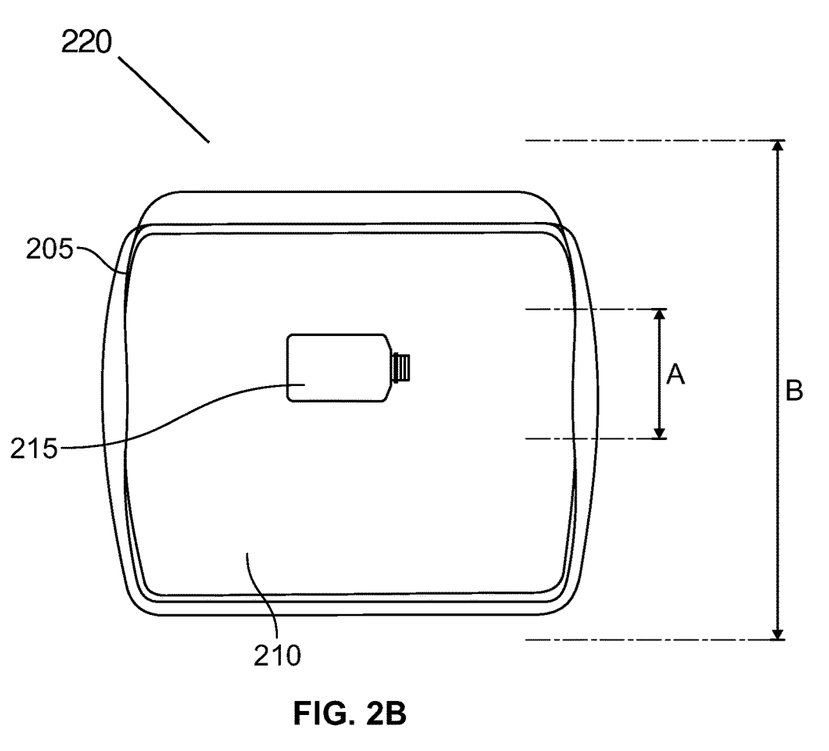
FIG. 2B is an X-ray image of the tray of FIG. 2A obtained using a dual-view embodiment of the inspection system of the present specification.

FIG. 2A shows an embodiment of an exemplary receptacle of the present specification in the form of a tray 205. The tray 205 comprises, in one embodiment, a foam insert 210 further comprising at least one channel for aligning at least one object 215 in an optimum position for screening. The insert is, in one embodiment, a mechanical component to ensure the container is in the optimum position for screening, which includes not having contact with other high density objects and mostly lifting the container off the belt for a cleaner view in the image. The insert does not need to be made of foam; it can be made of any lower density material than the container or contents for which screening is desired. In one embodiment, it is possible to make the plastic tray such that it can present the container for analysis, thus obviating the need for an insert.

FIG. 2B shows a dual-view X-ray image of the tray 205 while being transported on a conveyor belt. In accordance with an embodiment of the present specification, dimension B is the width of the conveyor belt 220 (the tunnel walls being very close to the edge of the belt). The tray 205 is wide enough such that is does not permit side-to-side movement. The width of the tray 205 coupled with the size and position of the channel in the foam insert 210 limits the region that can be occupied by the object 215 to a dimension A. Dimension A defines the minimum regions of the imaging arrays (for the respective projection views) that are required to be populated with energy discriminating detectors to enable a more precise physical property measurement (shown as portions 142, 147 in FIGS. 1A and 1B, respectively). In one embodiment, dimension A has a maximum of 125 mm at the belt, and when projected on the detector array this maximum dimension will occupy 20% of the imaging array while dimension B is 575 mm.

In one embodiment, the at least one object 215 is a LAG item that is divested from baggage/luggage and put in the tray 205 for scanning. However, in alternate embodiments, object 215 can be any item that is required to be scanned for threat resolution. In one embodiment, the object 215 is a piece of luggage/baggage and is scanned as-is, while being conveyed, without the need for putting the luggage/baggage or objects divested from the luggage/baggage in the tray 205.

Referring back to FIGS. 1A and 1B, the stacked detectors 120, 125 generate dual energy scan data in accordance with one embodiment. As known to persons of ordinary skill in the art, stacked detectors comprise a first detector positioned to detect more of the lower energy, or the softer X-ray photons, and a second detector positioned to detect the balance of the energy, namely the higher energy, or the harder photons. The second detector is typically positioned behind the first detector. The low energy and high energy measurements are combined in a suitable way using a series of calibration measurements derived from dual energy measurements taken of identified organic and metallic materials of known thicknesses and result in the display of images, including organic only or metal only images. The first and second detectors consist of linear arrays of silicon photodiodes covered with scintillation material, which produce light when exposed to X-rays. The light is detected by the photodiodes that produce corresponding photo current signals. The detected data are converted to digital format, corrected for detector gain and offset, and then stored for processing. In another embodiment, detectors 120, 125 are conventional single energy arrays as known to persons of ordinary skill in the art.

In one embodiment, the multiple-energy discriminating detectors 122, 127 are solid state detectors made from semiconductor materials such as cadmium-telluride (CdTe), cadmium-zinc-telluride (CZT), mercury iodide ($HgI_2$), selenium (Se), lead iodide ($PbI_2$), gallium arsenide (GaAs) or any other high-Z material that enables the detectors to be operable at room temperature. These detectors have high energy resolution, as compared to the dual energy stacked detectors and are direct conversion devices (that is, convert radioactive particles, such as photons, directly into electronic signals).

In one embodiment, a low-noise, low-power, multi-channel readout application-specific integrated circuit (ASIC) is used for the acquisition of scan data. Each channel of the ASIC has an energy discriminating circuit and a time discriminating circuit. The ASIC also has built-in analog to digital converters (ADCs), or digitizers, to digitize the signal from energy and timing sub-channels. Variation in the digital output of the ASIC is tracked from a reference signal output to generate correction coefficients. The correction coefficients may be then applied to subsequent digital outputs to eliminate or reduce temperature-induced error.

System 100 also comprises at least one processor (such as a computer) having access to a memory for storing programmatic instructions in the form of software and/or firmware. The at least one processor may be local to, or remote from, the X-ray source and detectors. Similarly, the memory and programmatic instructions may be local to, or remote from, the X-ray source and detectors.

In a single-view configuration, when the programmatic instructions are executed, the at least one processor: a) reconstructs a combined image from scan data generated by the detectors 120, 122 wherein each pixel within the image represents an associated mass attenuation coefficient of the object under inspection at a specific point in space and for a specific energy level; b) fits each of the pixels to a function to determine the mass attenuation coefficient of the object under inspection at the point in space; and c) uses the function to automatically determine the identity or threat status of the object under inspection.

In a dual-view configuration, when the programmatic instructions are executed, the at least one processor: a) reconstructs a combined image from scan data generated by the detectors 120, 122, 125 and 127, wherein each pixel within the image represents an associated mass attenuation coefficient of the object under inspection at a specific point in space and for a specific energy level; b) fits each of the pixels to a function to determine the mass attenuation coefficient of the object under inspection at the point in space; and c) uses the function to automatically determine the identity or threat status of the object under inspection.

In one embodiment, the function yields a relationship between mass attenuation coefficients and logarithmic values of energy. The function relates the energy response of the detector arrays at each energy within a range of energies multiplied by a function of the object's linear attenuation coefficient and density. Determining the identity or threat status of the object under inspection is performed by comparing the object's linear attenuation coefficient function to data comprising linear attenuation coefficient functions of predefined materials. The comparison yields a fit comparing the relationship between mass attenuation coefficients and logarithmic values of energy obtained from the object under inspection to pre-computed material data for known materials. This allows for improved discrimination of materials through better estimation of material physical properties such as density and effective atomic number. Based on the comparison, pixels which are determined to qualify as potential threat materials are automatically highlighted within the image.

Since the multiple-energy discriminating detectors possess higher energy resolution compared to the remaining stacked detectors, persons of ordinary skill in the art would appreciate that the use of multiple energy discriminating detectors enhances the physical property measurement of the system and therefore improves the automated threat detection capabilities.

Referring again to FIGS. 1A and 1B, during operation, when the receptacle containing the object under inspection is moving through the tunnel on conveyor 130 and passing through the X-ray projection fan beams of sources 110, 115, the detector modules 120, 122, 125 and 127 are sampled repetitively. The projection or scan data pertaining to the dual energy stacked detectors 120, 125 as well as the multi-energy discriminating detectors 122, 127 are displayed as an integrated image output such that there is no perceivable difference in the region of the image owing to the multi-energy discriminating detectors as opposed to the stacked detectors.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. A system for screening an object, comprising:
   a conveyor to move the object through an inspection region;
   a first X-ray source configured to transmit X rays through the object for generating a vertical X-ray projection view of the object;
   a second X-ray source configured to transmit for X rays through the object for generating a horizontal X-ray projection view of the object, wherein the vertical X-ray projection view and horizontal X-ray projection view spatially overlap and define the inspection region;
   a first array of detectors, wherein the first array of detectors comprises a first set of dual-energy sensitive detectors and a first set of energy discriminating detectors positioned adjacent, not behind, each other relative to the first X-ray source; and
   a second array of detectors, wherein the second array of detectors comprises a second set of dual-energy sensitive detectors and a second set of energy discriminating detectors positioned adjacent, not behind, each other relative to the first X-ray source and wherein the second array of detectors are positioned substantially perpendicular to the first array of detectors within the inspection region.

2. The system of claim 1 further comprising a receptacle configured to carry the object on the conveyor, wherein the receptacle is a tray further comprising a foam insert that has at least one channel to align the object for screening.

3. The system of claim 1 wherein the first set of dual-energy sensitive detectors comprise stacked detectors.

4. The system of claim 1 wherein the first set of energy discriminating detectors and second set of energy discriminating detectors are fabricated from high-Z semiconductor materials including at least one of cadmium-telluride (CdTe), cadmium-zinc-telluride (CZT), mercury iodide ($HgI_2$), selenium (Se), lead iodide ($PbI_2$), or gallium arsenide (GaAs).

5. The system of claim 1 wherein the object is a liquid, aerosol, gel (LAG) item.

6. The system of claim 1 further comprising a processor for receiving output signals from each of the first array of detectors and the second array of detectors and overlaying said output signals onto a visual image of the object.

7. A method for screening an objects, comprising:
   moving the object through an inspection region using a conveyor;
   generating a vertical X-ray projection view of the object using a first X-ray source;
   generating a horizontal X-ray projection view of the object using a second X-ray source, wherein the vertical X-ray projection view and horizontal X-ray projection view spatially overlap and define the inspection region;
   detecting X-rays transmitted through the said object using a first array of detectors and a second array of detectors, wherein the first array of detectors comprises a first set of dual-energy sensitive detectors and a first set of energy discriminating detectors positioned adjacent, not behind, each other relative to the first X-ray source and wherein the second array of detectors comprises a second set of dual-energy sensitive detectors and a second set of energy discriminating detectors positioned adjacent, not behind, each other relative to the first X-ray source and wherein the second array of detectors are positioned substantially perpendicular to the first array of detectors within the inspection region.

8. The method of claim 7 further comprising a receptacle wherein the receptacle is a tray further comprising a foam insert that has at least one channel to align the object for screening.

9. The method of claim 7 wherein the first set of dual energy sensitive detectors and the second set of dual energy sensitive detectors comprise stacked detectors.

10. The method of claim 7 wherein the first set and second set of energy discriminating detectors comprise at least one of high-Z semiconductor materials, cadmium-telluride (CdTe), cadmium-zinc-telluride (CZT), mercury iodide ($HgI_2$), selenium (Se), lead iodide ($PbI_2$), or gallium arsenide (GaAs).

11. The method of claim 7 wherein the object is a liquid, aerosol, gel (LAG) item.

12. The method of claim 7 further comprising processing output signals from the first array of detectors and the second array of detectors to form a visual image of the object.

* * * * *